United States Patent [19]

Loyd

[11] 4,113,910

[45] Sep. 12, 1978

[54] COMPOSITE LOAD COUPLER FOR REINFORCING COMPOSITE STRUCTURAL JOINTS

[75] Inventor: Morris S. Loyd, Northridge, Calif.

[73] Assignee: Rockwell International Corporation, El Segundo, Calif.

[21] Appl. No.: 791,360

[22] Filed: Apr. 27, 1977

[51] Int. Cl.² ............................ B64C 1/00; F16B 2/14
[52] U.S. Cl. .................................... 428/162; 244/120;
244/125; 244/131; 403/374; 403/404; 403/409;
428/113; 428/119; 428/302
[58] Field of Search ............... 244/119, 120, 125, 126,
244/131, 133; 403/404, 409, 374; 428/156, 113,
119, 134, 161, 162, 295, 302

[56] References Cited

U.S. PATENT DOCUMENTS

| 1,549,721 | 8/1925 | Kraft | 244/131 X |
|---|---|---|---|
| 3,490,983 | 1/1970 | Lee | 244/119 |
| 3,880,533 | 4/1975 | Gostling | 403/409 X |
| 3,910,531 | 10/1975 | Leomand | 244/119 |
| 4,006,498 | 2/1977 | Cuschera | 403/374 X |

Primary Examiner—Harold Ansher
Attorney, Agent, or Firm—Charles T. Silberberg

[57] ABSTRACT

A composite reinforcement member is provided for reinforcing composite structural joints. The reinforcement member is optimally a laminate of fiber composite sheets of uniform size and shape which are adhesively bonded together. By virtue of the shape of the laminate and arrangement of the sheets, the fibers substantially distribute a tension load to minimize peel forces on the structural joint.

29 Claims, 14 Drawing Figures

COMPOSITE LOAD COUPLER FOR REINFORCING COMPOSITE STRUCTURAL JOINTS

BACKGROUND OF THE INVENTION

The present invention relates generally to reinforcement assemblies for strengthening structural joints. More particularly, the invention is directed to a composite reinforcement member for reinforcing composite structural joints, such as a type frequently used in aircraft and spacecraft, where such reinforcement member when mounted to the structural joint distributes a tension force on the joint such that peel forces on the joint are minimized.

Usage of composite materials in structures has been increasing rapidly. This is particularly true in the aerospace industry where the lightweight, high-strength characteristics of these materials are particularly desirable. In this art, strong, lightweight, tough, self-sustaining sheet material has been developed, these materials being composed as a class, of a resinous sheet reinforced with layers of continuous, lineally aligned, parallel filaments. These sheets may be formed as a single layer sheet or as multi-layer laminates, and thereafter thermoset to tough, hard, exceptionally strong panels, or skins for aircraft and the like.

As initially formed, these sheet materials are flexible and deformable, providing panel-forming members which can be draped or otherwise conformed to various shapes and thereafter cured, by thermosetting, upon the application of heat and pressure thereto, to tough, strong skins or panels of permanent shape retention and having exceptional tensile strength imparted by the continuous filament reinforcing.

Panels or skins made up of these materials are exceptionally strong, lightweight structural units. However, structural joints made by the inclusion of reinforcing ribs or the like on such panels have heretofore seen limited applicability. Presently, these skins or panels are typically joined by first curing the sheet material into the desired shape and adhesively bonding a web or rib structure to the panel through the medium of a thermosetting adhesive. However, it has been found that tension loads at unacceptably low values on the panel or skin result in "peel" forces which tend to separate the web and panel at their interface.

Various attempts have been made to solve this problem with composite rib/sheet joints. Thus, metal rivets and bolts have been used at the interface. Unfortunately, this has increased the weight of the resulting structure, increased fabrication time, required more plies of material due to the reduced strength resulting from necessary holes, and presented sealing problems where the panel forms part of a container, such as a fuel tank. Embedding a metal (such as titanium) "T" element into the joint has also been utilized. This has also been found to be unsatisfactory in that the element is expensive, increases the weight of the structure, requires a critical priming operation, is incompatible with the surrounding material due to its higher thermal coefficient of expansion, and is too rigid thereby resulting in a notch effect.

SUMMARY OF THE INVENTION

It is, therefore, an object of the present invention to provide a composite reinforcement member for composite structural joints which minimizes peel forces at the joint interface.

It is another object of the present invention to provide a reinforcement member for composite structural joints which is lightweight, inexpensive, and compatible with the materials of the joint structure.

It is yet another object of the present invention to provide a reinforced composite structure which can be fabricated efficiently, is relatively inexpensive, lightweight, and has uniform thermal expansion, increased strength, and increased resistance to peel forces at the joint interface.

Briefly, in accordance with the invention, there is provided a composite reinforcement member for structural joints in the form of a generally wedge-shaped laminate. The laminate is defined by a shank and an adjoining base. The shank has two longitudinal sides. The base extends arcuately outward at the shank and tapers in thickness as it so extends. The laminate has a plurality of adhesively-bonded fiber composite sheets of uniform size and shape. The sheets are arranged such that the fibers substantially distribute as a shear load along the longitudinal sides of the shank a tension load on the base.

In another form of the invention, a reinforced composite structure is provided by bonding the reinforcement member to a panel and web. The web has a first portion positioned parallel to the panel which is directly joined to the panel. A second portion of the web is positioned transversely to the panel. A fillet portion between the first and second portion of the web is also defined. The reinforcement member has its base adjoining the panel and the fillet portion of the web. The shank of the reinforcement member adjoins the second portion of the web. As such, a tension load on the panel is distributed by the reinforcement member such that peel forces on the fillet portion of the web are minimized.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Figure 1:
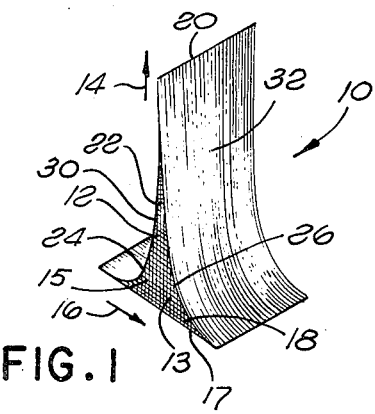
FIG. 1 is a perspective view of a reinforcement member according to the present invention.

Referring now to FIG. 1, there is shown according to the present invention a load coupler or reinforcement member generally indicated at 10. Rather than fabricating reinforcement member 10 from metal, as is the current practice in the art, Applicant's reinforcement member is formed from composite material. Any suitable composite material can be used. For example, some such materials are graphite fibers in an epoxy or polyamide matrix and fiberglass fibers in an epoxy or polyamide matrix. Applicant has found the graphite epoxy material to be particularly well suited to the present invention.

A variety of forms of the material selected can be used. This includes composite tape, cloth, felt, chopped fiber mat, and chopped fiber resinous molding compound. Of these, it has been found that the most preferred form of material is composite tape. Composite tape normally comes as thin-sheet material reinforced with unidirectional, linearly-arranged, non-woven, continuous, parallel reinforcing filaments. Composite cloth has its fibers woven into the matrix material. Unlike tape, cloth also has fill fibers which run laterally to the warp or longitudinal fibers. The chopped fiber mat or molding compound is characterized by discontinuous, randomly-oriented filaments which are embedded in the matrix material.

With the above forms of composite material, except for the chopped fiber molding compound, the reinforcement member 10 is formed as a multi-layer laminate. The layers of the laminate are normally formed by blanking the desired shape from sheets of the composite material. The layers or sheets of the laminate are of uniform size and shape and are stacked to the desired length to form reinforcement member 10. The layers are bonded together by means of a thermosetting resin which is contained in the material itself when acquired in preimpregnated form. Since reinforcement member 10 is formed of composite material and is easily fabricated as described above, it is light in weight and inexpensive, especially when compared to a metal reinforcement member which is machined or otherwise fabricated into shape.

Figure 14:
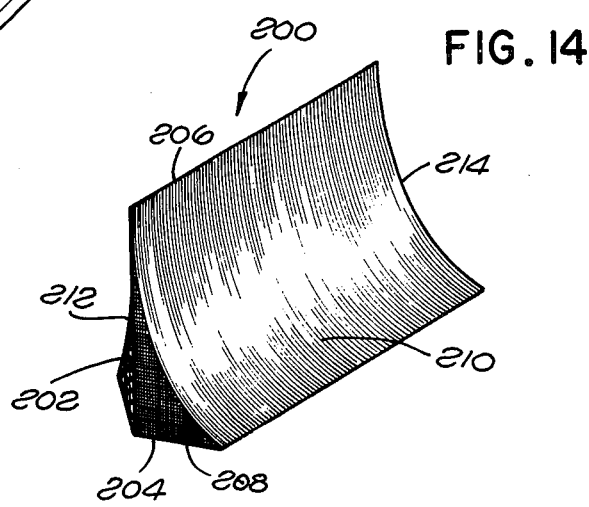
FIG. 14 is a perspective view of another embodiment of reinforcement member according to the present invention as formed in an angle shape.

In keeping with the invention, consideration must be given to the fiber orientation in stacking the layers of the laminate, except where using the chopped fiber molding compound. It is important that the fibers of the laminate run in at least two directions. This is illustrated on face sheet 12 of reinforcement member 10. Thus, there are longitudinal fibers 13 running in the direction of arrow 14 and transverse fibers 15 in the direction of arrow 16. For most embodiments, the longitudinal and transverse fibers will optimally be orthogonally oriented. Normally, this will take the form of a 0°/90° orientation where the 0° axis is parallel to the flat bottom 17 of the base 18 of member 10. Thus, the transverse fibers are 0° fibers and the longitudinal fibers are 90° fibers. It should of course be understood that other orientations can be used, such as −45°/45°, 0°/85°, etc., depending upon the particular geometry of the reinforcing member 10 and/or the joint to be reinforced. It is also important, for reasons which will become apparent, that the fibers of the laminate be laid up as shown in FIG. 1 where the transverse fibers are in the direction of arrow 16 and not in the direction of upper edge 20 of member 10 (although a combination approach as shown in FIG. 14 or providing additional fibers in the direction of edge 20 can be used if a three-dimensional effect is desired).

To achieve cross fiber orientation with fiber composite tape, it is necessary to stack the individual sheets of the laminate such that the filaments of each adjacent layer are angularly disposed to one another. This can be accomplished by blanking out the plies from the tape sheets such that in one case the layers have longitudinal fibers and in the other case transverse fibers. The layers with longitudinal fibers are stacked alternately with the layers with transverse fibers. Once the layers are bonded together, the longitudinal fibers are connected to the transverse fibers by virtue of the bonding. The layers of composite cloth do not have to be alternated in that the individual sheets of cloth have both longitudinal (warp) fibers and transverse (fill) fibers.

In selecting which form of material to use as between tape and cloth, tape would normally be used because layers can more easily be stacked. However, such a selection will normally depend upon the application. Also, it may be desirable to combine different forms of material. Thus, some of the layers of member 10 can be formed of tape while others of cloth or chopped fiber material.

Figure 7:
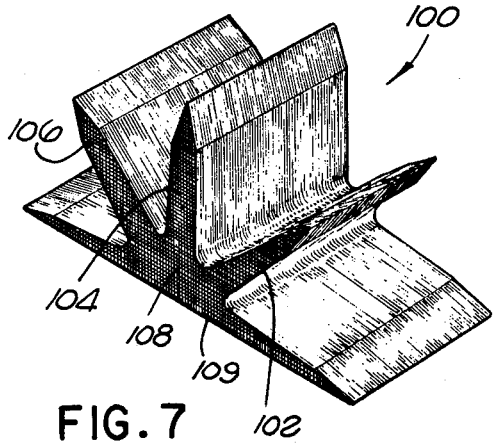
FIG. 7 is a perspective view of another embodiment of a reinforcement member according to the present invention illustrating the plurality of shanks of such member.

As seen in FIG. 1, reinforcement member 10 is generally wedge-shaped. In this regard, it is meant that the structure has an enlarged base with sides tapering to a thin edge. However, it is also to be interpreted as including an embodiment such as illustrated in FIG. 7 where there are a number of sides which taper to a thin edge connected to an enlarged base.

Member 10 is generally defined by a shank 22 and base 18. Shank 22 has two longitudinal sides 30 and 32 which converge or taper to a thin upper edge 20. While the interface between shank 22 and base 18 is not specifically delineated in that each layer of the laminate is preferably integral, such can be approximated by considering the transition at a fillet area 24 and 26 on each side of member 10. Thus, base 18 extends arcuately outward from shank 22. By virtue of this diverging arcuate contour and flat bottom 17 of base 18, it is seen that the base 18 is tapered as it extends from shank 22. Again, because member 10 is made of composite material rather than metal, its shape can include such a finely tapered base.

With further reference to FIG. 1, it can now be seen that a flatwise tension load on the bottom face 17 of base 18 is distributed through longitudinal fibers 13 and the connected transverse fibers 15. Accordingly, the tension load is transmitted by the fibers to fillet areas 24 and 26 of base 18 and longitudinal sides 30 and 32 of shank 22. Since the great majority of fibers terminate at the longitudinal sides 30 and 32 of shank 22, the bulk of the tension force is transferred to longitudinal sides 30 and 32. This minimizes the force in fillet areas 24 and 26. It should now be understood that transverse fibers 15 should not be solely oriented in the direction of edge 20 because the tension load would then not be transferred to sides 30 and 32 in that a minimal amount of fibers would terminate on said sides.

Figure 2:
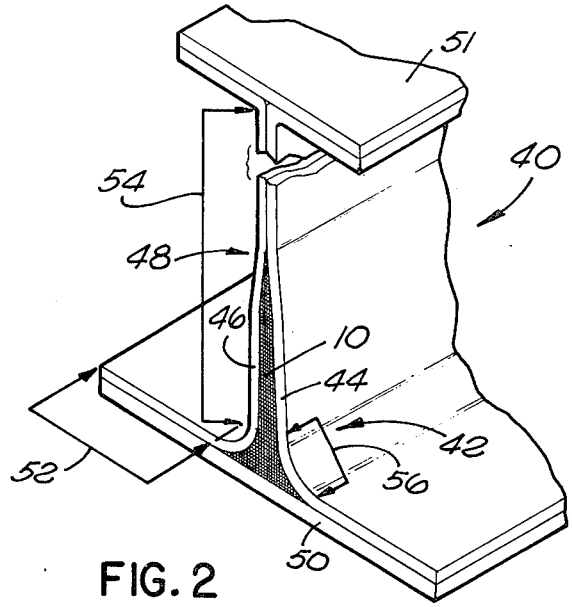
FIG. 2 is a perspective view of a reinforced composite structure according to the present invention illustrating a joint reinforced by the reinforcement member of FIG. 1.

FIG. 2 illustrates a reinforced composite structure generally indicated at 40 which utilizes load coupler 10 to reinforce the structural joint generally indicated at 42 which is defined by opposed sheets 44 and 46 making up a web generally indicated at 48 and composite panel or skin 50. Normally, web 48 would also be joined to an upper panel or spar cap 51. A portion 52 of each of sheets 44 and 46 is positioned parallel and adjacent to panel 50. A second portion 54 of sheets 44 and 46 extends transversely to panel 50. In the embodiment illustrated in FIG. 2, the second portion 54 is approximately orthogonally disposed to panel 50. Sheets 44 and 46 also have a fillet portion 56 between first portion 52 and second portion 54. Load coupler 10 is positioned between sheets 44 and 46 of web 48 and panel 50 such that the bottom face 17 of coupler 10 rests directly on panel 50, fillet areas 24 and 26 are adjacent to fillet areas 56 of sheets 44 and 46, and shank 22 bears against second portion 54 of sheets 44 and 46. As can be seen in FIG. 2, the longitudinal fibers 13 of reinforcement member 10 are parallel to the center line (not shown) of web 48 and transverse fibers 15 are parallel to panel 50. It has been found that normally this is the optimal configuration of such fibers.

Each of the individual composite parts of the structure, i.e. web 48, panel 50, and coupler 10, can be separately cured prior to layup in the overall configuration as shown in FIG. 2. Once layup has been completed, the reinforced composite structure is cured with the individual parts adhesively bonded together through a thermosetting adhesive. Alternately, a layup of the reinforced composite structure could be accomplished prior to curing of the individual parts. Then the individual parts and the structure as a whole could be co-cured in one operation. As can be seen, especially with the use of this latter technique, fabrication of the reinforced composite structure is relatively simple and inexpensive. The need for drilling holes and applying fasteners or embedding a metal "T" into the structure with the required machining and critical priming steps is obviated. In addition, as the reinforcement member 10 would normally be of the same material as web 48 and panel 50, i.e. a composite, defects due to the reinforcement member having a different coefficient of thermal expansion are avoided. It should also be understood that a composite reinforcement member is more flexible than a metal reinforcement member such as the previously described metal "T." As such, structural defects caused by the composite panel 50 and/or web 48 flexing while the reinforcement member doesn't, are avoided.

Figure 3:
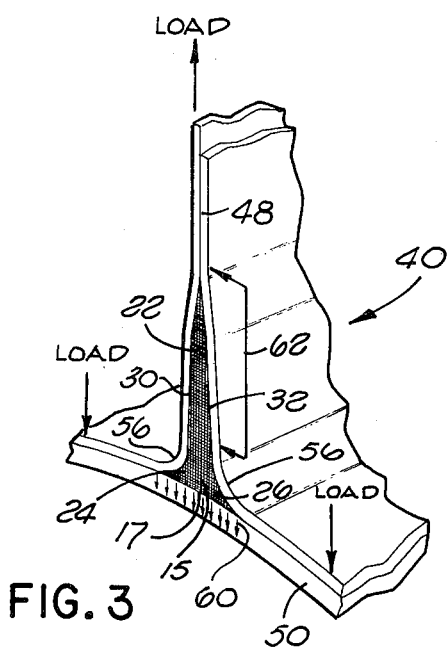
FIG. 3 is a perspective view of the reinforced joint of the FIG. 2 structure illustrating distribution of a tension load.

FIG. 3 illustrates the joint of the FIG. 2 structure under a tension load applied to panel 50. Under normal conditions, without the present reinforcement member 10, such a load would, at undesirably low levels, cause a peeling of web 48 from panel 50 at fillet areas 56. However, by virtue of load coupler 10, the load on panel 50 is transmitted as a flatwise tension load 60 on bottom face 17 of reinforcement member 10 which is transferred through fibers 13 and 15 to longitudinal sides 30 and 32 of shank 22 and fillets 24 and 26 of base 15. However, as previously explained, the great majority of the load is taken up by longitudinal sides 30 and 32 of shank 22. Effectively, the load bypasses the peel-prone fillet areas 56 of web 48 to the longitudinal sides 30 and 32 of shank 22 where there is a double-shear bond joint to web 48. This is indicated by the area designated 62 which shows where the load is transferred with reference to longitudinal side 30 of shank 22.

Figure 4:
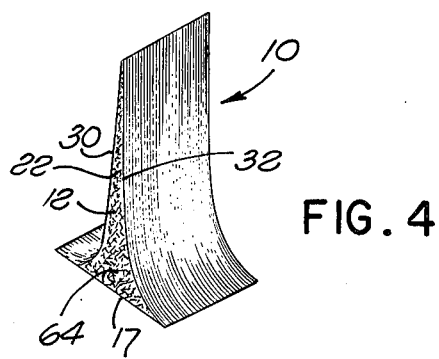
FIG. 4 is a perspective view of another embodiment of a reinforcement member according to the present invention as formed from an alternate material.

FIG. 4 illustrates the reinforcement member 10 when made from chopped fiber mat material. As can be seen on face sheet 12 of member 10, the fibers 64 are randomly oriented. This material is also useful, according to the present invention, in that it is inexpensive, and easily stacked. The fibers of this type of embodiment also provide a path to transfer a flatwise tension load on the bottom face 17 to longitudinal sides 30 and 32 of shank 22. However, it has been found that this is not as efficiently accomplished as with the tape or cloth material. As such, a reinforcement member 10 of chopped fiber mat material would normally be used for moderately-loaded joints. A reinforcement member 10 of chopped fiber molding compound would appear similar to that as shown in FIG. 4. However, this type of member 10 would be formed as a unitary structure molded to the proper shape. However, the chopped fiber molded material member 10 has also been found to be only useful for moderately loaded joints.

Figure 5:
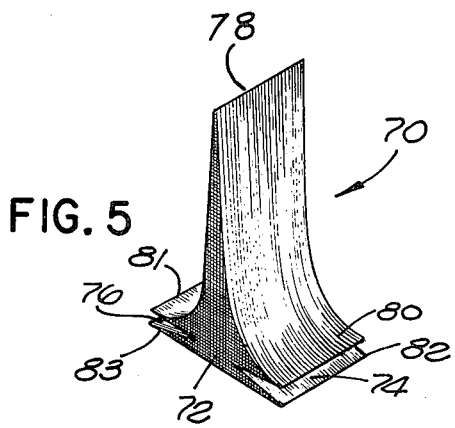
FIG. 5 is a perspective view of another embodiment of a reinforcement member according to the present invention.
Figure 6:
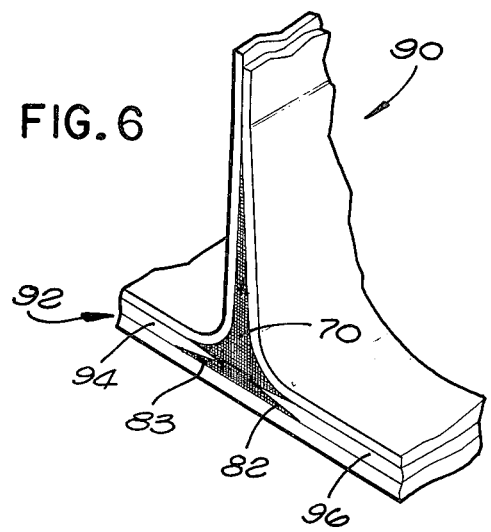
FIG. 6 is a perspective view of a reinforced structural joint utilizing the FIG. 5 embodiment.

Another embodiment of reinforcement member which is generally indicated at 70 is illustrated in FIG. 5. Member 70 has a base 72 which has grooves or slits 74 and 76 in its longitudinal sides extending substantially parallel to upper edge 78. By virtue of slits 74 and 76, base 72 has a plurality of branches 80, 81, 82, and 83. When member 70 is used in a joint such as generally indicated at 90 in FIG. 6, it has been found that the resistance to tension loads such as described with reference to FIG. 3 is further increased. This is due to the anchoring effect that branches 82 and 83 and slits 74 and 76 have within panel 92. Panel 92 is a multi-ply laminate composite. Reinforcement member 70 is anchored within panel 92 by having some of the plies 94 and 96 of panel 92 fitted within grooves 74 and 76.

FIG. 7 illustrates another embodiment of load coupler which is generally indicated at 100. Member 100 has a plurality of angularly-spaced shanks 102, 104, and 106. Such a reinforcement member 100 would be used where multiple webs (not shown) are required to connect to the same structural joint. Shanks 102, 104, and 106 would be oriented to each align with a web. While the fiber orientation shown for this embodiment, as seen on face 108, is 0°/90°, another efficient orientation which takes into account the angular orientation of each of the shanks could be used as an alternate. Thus, if member 100 was made with unidirectional tape, the 0° axis was parallel to bottom face 109, and the shanks spaced at 45° intervals, the sheets of the laminate would alternately have 0°/45°/90°/135° fiber orientation.

Figure 8:
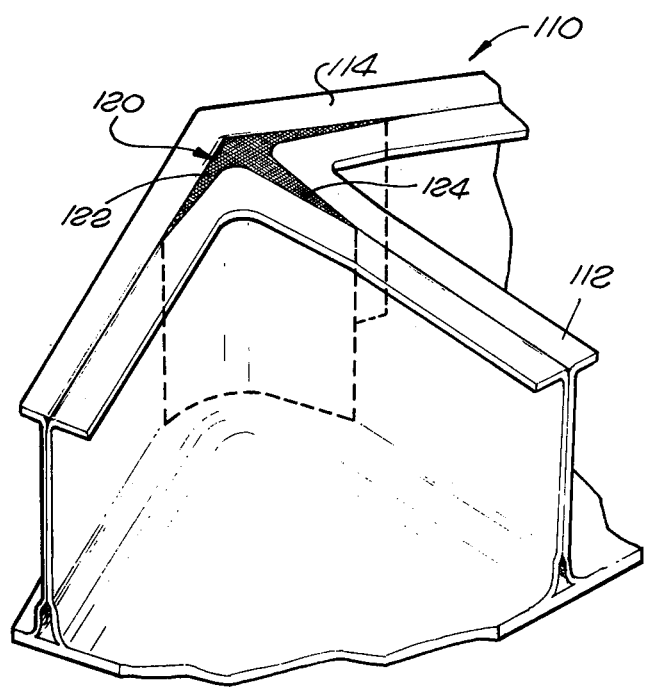
FIG. 8 is a perspective view of a reinforced composite structure illustrating the usage of another embodiment of reinforcing member having an angle-shaped base which reinforces the joint of such structure.

FIG. 8 shows still another embodiment of the present invention. In this embodiment, there is shown a reinforced composite structure generally indicated at 110 where a canted rib 112 is attached to a spar or panel 114 which is angle-shaped. For this situation, a reinforcing member generally indicated at 120 of similar geometry is used. Member 120 has an angle-shaped base 122 with the same angle as spar 114. Canted rib 112 bisects the angle of spar 114. Shank 124 accordingly bisects the angle of base 122. Preferably, member 120 would have as shown its longitudinal fibers running in a direction parallel to the center line (not shown) of shank 124 (and also rib 112) and its transverse fibers perpendicular to the longitudinal fibers.

Figure 9:
FIG. 9 is a perspective view of a modified form of reinforcement member according to the present invention illustrating a slotted base having a number of bores therein for joining to other elements.
Figure 10:
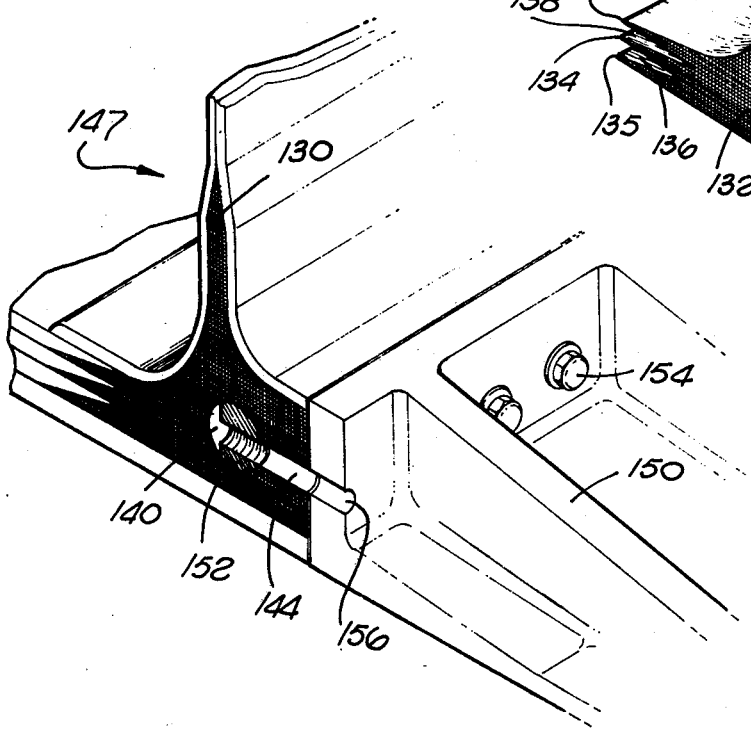
FIG. 10 is a perspective view of a reinforced structural joint utilizing the reinforcement member of FIG. 9.

FIG. 9 illustrates another embodiment of the present invention which is generally indicated at 130. Member 130 has a base 132 having multiple branches 133, 134, and 135 on one end thereof with a slot 138 defined between branches 133 and 134 and slot 136 defined between branches 134 and 135. Member 130 has a first bore 140 extending in a generally parallel direction to upper edge 142. A plurality of transverse bores 144 are provided which connect bore 140 to outer edge 146 of base 132. With reference to FIG. 10, it can be seen that the load coupler 130 can be used to mechanically fasten a joint generally indicated at 147 to another structure 150. This can be accomplished by providing a barrel nut 152 in bore 140 and inserting fasteners 154 through a plurality of holes 156 provided in member 150 which are in alignment with bores 144. Fasteners 154 are connected to barrel nut 152 to bolt structure 150 to joint 147.

Figure 11:
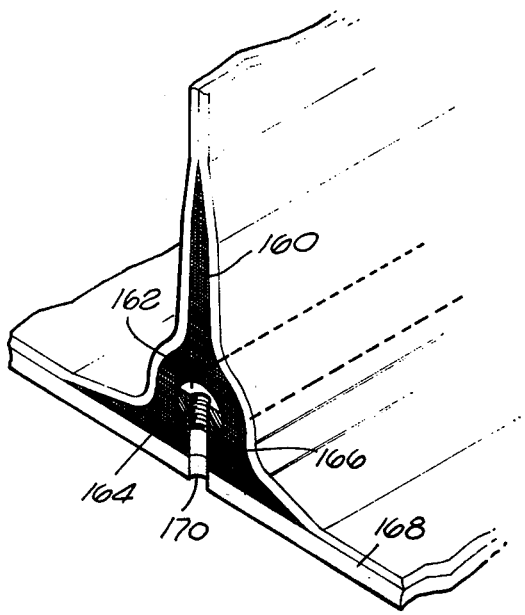
FIG. 11 is a perspective view of a reinforced composite structure utilizing a modified form of reinforcement member where the base of such member has a number of bores therein.

FIG. 11 illustrates another embodiment of the present invention where reinforcement member 160 has a bore 162 and barrel nut 164 provided therein. However, transverse bore 166 extends toward the panel 168. A hole 170 is provided within panel 168 in alignment with bore 166. Thus, a structure can be mechanically fastened directly to the bottom of panel 166 with the use of reinforcement member 160.

Figure 12:
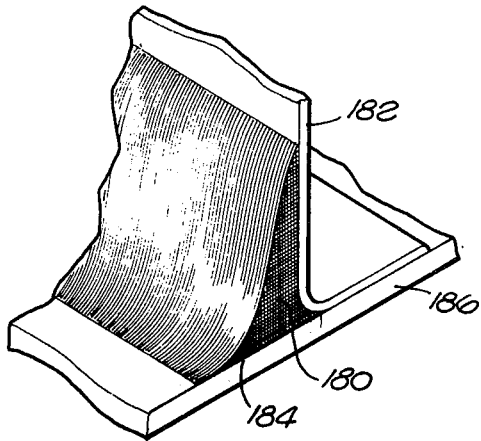
FIGS. 12 and 13 are perspective views illustrating reinforced structural joints utilizing a modified form of reinforcement member according to the present invention.
Figure 13:
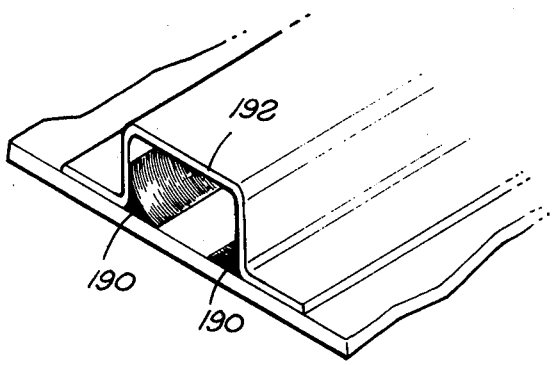

FIGS. 12 and 13 illustrate the use of reinforcement members 180 and 190 respectively. In FIG. 12, member 180 is used to reinforce a single sheet web 182 by being joined to one side of web 182 and having its base 184 joined to panel 186. Similarly, members 190 reinforce hat section 192.

FIG. 14 illustrates an angle-shaped reinforcement member generally indicated at 200. As previously described with reference to FIG. 1, member 200 is a laminate of a plurality of individual sheets. In this case, however, the individual sheets are bent (or equivalently angularly joined where two complementary individual portions make up a sheet) along a line 202. The bending should be done when the sheets are in the flexible, deformable condition prior to curing.

Line 202 is preferably a center line of the sheet which extends from the base 204 to edge (or in the case of the individual sheet, the tip) 206. Accordingly, transverse fibers 208 are angle-shaped and have a vertex along center line 202. Preferably, the bend in each sheet is such that the transverse fibers 208 on opposite sides of center line 202 are orthogonally disposed to each other.

An advantage of this embodiment is that it produces a three-dimensional strengthening due to the oblique direction of transverse fibers 208. Thus, through the cross-fiber orientation previously described, the fibers still distribute a tension load on base 204 as a shear load along longitudinal sides 210 in that transverse fibers 208 are still directed to and terminate along longitudinal sides 210. However, since transverse fibers 208 are directed obliquely rather than perpendicular to edge 206, they will also have a component effect in the direction of edge 206. As a result, member 200 will be more flexible, i.e. less brittle, in reacting to forces parallel to edge 206.

Once the laminate of member 200 is formed and preferably cured, the ends 212 and 214 can be trimmed if desired to eliminate the protruding portion (of end 212) and indented portion (of end 214). This may be desired for dimensional reasons when reinforcing a structural joint in the manner illustrated in FIG. 2.

Thus it is apparent that there has been provided, in accordance with the invention, a composite load coupler for reinforcing composite structural joints that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and scope of the appended claims.

What is claimed is:

1. A composite reinforcement member for structural joints comprising:
 a generally wedge-shaped laminate, said laminate being defined by a shank and a base, said shank having two longitudinal sides, said shank adjoining said base, said base extending arcuately outward from said shank, said base being tapered in thickness as it extends from said shank, said laminate having a plurality of fiber composite sheets of uniform size and shape, said sheets being adhesively bonded together, said sheets being arranged such that the fibers substantially distribute a tension load on said base as a shear load along said longitudinal sides of said shank.

2. The reinforcement member of claim 1 wherein said fiber composite sheets are formed from unidirectional fiber composite tape.

3. The reinforcement member of claim 1 wherein at least some of said fiber composite sheets are formed from composite cloth.

4. The reinforcement member of claim 3 wherein at least some of said fiber composite sheets are formed from fiber composite tape.

5. The reinforcement member of claim 2 wherein said sheets are arranged such that the fibers in each sheet are substantially orthogonally disposed to the fibers of adjacent sheets.

6. The reinforcement member of claim 1 wherein said longitudinal sides meet at an edge of said laminate, and said base has a groove therein substantially parallel to said edge.

7. The reinforcement member of claim 1 wherein said laminate is defined by a plurality of articulated shanks, said shanks adjoining said base, said shanks being angularly spaced from one another.

8. The reinforcement member of claim 1 wherein said longitudinal sides meet at an edge of said laminate, said base has a first bore axially extending in a parallel direction to said edge, and a transverse bore extending from said first bore to an edge of said base.

9. The reinforcement member of claim 2 wherein said sheets are arranged such that the fibers in each sheet are angularly oriented to the fibers of the adjacent sheets.

10. The reinforcement member of claim 9 wherein said base is angle-shaped, and said shank bisects said base.

11. The reinforcement member of claim 1 wherein said longitudinal sides meet at an edge of said laminate, and said sheets are arranged such that the fibers have a component effect in a direction parallel to said edge.

12. The reinforcement member of claim 1 wherein at least some of said fibers are angle-shaped.

13. A reinforcement member for structural joints comprising:
a generally wedge-shaped laminate, said laminate being defined by a shank and a base, said shank adjoining said base, said shank having two longitudinal sides, said base extending arcuately outward from said shank, said base being tapered in thickness as it extends from said shank, said laminate being formed of a plurality of sheets of chopped fiber mat material, said sheets being of uniform size and shape, said sheets being adhesively bonded together, wherein the fibers of said sheets substantially distribute a tension load on said base as a shear load along said longitudinal sides of said shank.

14. A reinforced composite structure comprising:
a composite panel, said panel having a plurality of fiber composite plies, said plies being bonded together;
a composite web, said web having a sheet of fiber composite material, said sheet having at least one layer, said sheet having three portions, a first portion positioned parallel to said panel, said first portion being joined to said panel, a second portion positioned transversely to said panel, and a fillet portion between said first and second portions; and
a reinforcement member, said member comprising a generally wedge-shaped laminate, said laminate being defined by a shank and a base, said shank adjoining said base, said shank having two longitudinal sides, said base extending arcuately outward from said shank, said base being tapered in thickness as it extends from said shank, said laminate having a plurality of fiber composite sheets of uniform size and shape, said sheets of said laminate being adhesively bonded together, said sheets of said laminate being arranged such that the fibers thereof substantially distribute a tension load on said base as a shear load along said longitudinal sides of said shank, said reinforcement member being bonded to said web and said panel, said base adjoining said panel and said fillet portion of said web, and said shank adjoining said second portion of said web, whereby a tension load on said panel is distributed by said reinforcement member such that peel forces on said fillet portion are minimized.

15. A reinforced composite structure comprising:
a composite panel, said panel having a plurality of fiber composite plies, said plies being bonded together;
a composite web, said web having a sheet of fiber composite material, said sheet having at least one layer, said sheet having three portions, a first portion positioned parallel to said panel, said first portion being joined to said panel, a second portion positioned transversely to said panel, and a fillet portion between said first and second portions; and
a reinforcement member, said member comprising a generally wedge-shaped structure, said member being defined by a shank and a base, said shank adjoining said base, said shank having two longitudinal sides, said base extending arcuately outward from said shank, said base being tapered in thickness as it extends from said shank, said member being formed of chopped fiber material, said reinforcement member being bonded to said web and said panel, said base adjoining said panel and said fillet portion of said web, and said shank adjoining said second portion of said web, whereby a tension load on said panel is distributed by said reinforcement member such that peel forces on said fillet portion are minimized.

16. The reinforced composite structure of claim 14 wherein said composite web has two sheets, and wherein said reinforcement member is positioned between said sheets of said web.

17. The reinforced composite structure of claim 16 wherein said fiber composite sheets of said reinforcement member are formed from unidirectional fiber composite tape.

18. The reinforced composite structure of claim 16 wherein at least some of said fiber composite sheets of said reinforcement member are formed from composite cloth.

19. The reinforced composite structure of claim 18 wherein at least some of said fiber composite sheets of said reinforcement member are formed from composite tape.

20. The reinforced composite structure of claim 17 wherein said sheets of said reinforcement member are arranged such that the fibers in each sheet are substantially orthogonally disposed to the fibers of adjacent sheets.

21. The reinforced composite structure of claim 16 wherein said base of said reinforcement member has a groove therein, and a portion of one of said plies of said composite panel is positioned within said groove.

22. The reinforced composite structure of claim 14 wherein there is a plurality of composite webs, said laminate is defined by a plurality of articulated shanks and a base, said shanks adjoining said base, said shanks being angularly spaced from one another.

23. The reinforced composite structure of claim 16 wherein said longitudinal sides meet at an edge of said laminate, said base has a first bore axially extending in a parallel direction to said edge and a transverse bore extending from said first bore to an edge of said base.

24. The reinforced composite structure of claim 17 wherein said sheets of said reinforcement member are arranged such that the fibers in each sheet are angularly oriented to the fibers of the adjacent sheets.

25. The reinforced composite structure of claim 24 wherein said base is angle-shaped, and said shank bisects said base.

26. The reinforced composite structure of claim 23 wherein said panel has a bore therein in alignment with said transverse bore.

27. The reinforced composite structure of claim 14 wherein said fiber composite sheets of said laminate are of chopped fiber mat material.

28. The reinforced composite structure of claim 14 wherein said longitudinal sides meet at an edge of said laminate, and said sheets of said laminate are arranged such that the fibers have a component effect in a direction parallel to said edge.

29. The reinforced composite structure of claim 14 wherein at least some of said fibers of said sheets of said laminate are angle-shaped.

* * * * *